United States Patent
Mattingly et al.

(10) Patent No.: US 7,996,263 B2
(45) Date of Patent: Aug. 9, 2011

(54) BUSINESS METHOD FOR PROMOTING GOODS AND SERVICES OF PROVIDERS

(75) Inventors: Brian Mattingly, Charlotte, NC (US); Edward Joseph Fain, Woodstock, GA (US)

(73) Assignee: Welcomemat Services, Inc., Charlotte, NC (US)

(*) Notice: Subject to any disclaimer, the term of this patent is extended or adjusted under 35 U.S.C. 154(b) by 0 days.

(21) Appl. No.: 12/658,812

(22) Filed: Feb. 16, 2010

(65) Prior Publication Data
US 2010/0153186 A1   Jun. 17, 2010

Related U.S. Application Data

(63) Continuation of application No. 10/932,599, filed on Sep. 2, 2004, now abandoned.

(60) Provisional application No. 60/523,877, filed on Nov. 20, 2003.

(51) Int. Cl.
*G06Q 30/00* (2006.01)
*G05B 19/418* (2006.01)

(52) U.S. Cl. ........ 705/14.1; 235/375; 705/406; 705/407

(58) Field of Classification Search .................. 235/375; 705/406, 407
See application file for complete search history.

(56) References Cited

U.S. PATENT DOCUMENTS

| | | | |
|---|---|---|---|
| 4,752,675 A * | 6/1988 | Zetmeir | 235/375 |
| 5,353,218 A | 10/1994 | De Lapa et al. | |
| 5,710,886 A * | 1/1998 | Christensen et al. | 705/14.26 |
| 6,063,229 A * | 5/2000 | Miles et al. | 156/277 |
| 6,850,209 B2 | 2/2005 | Mankins et al. | |
| 6,868,389 B1 * | 3/2005 | Wilkins et al. | 705/10 |
| 2002/0026359 A1 | 2/2002 | Long et al. | |
| 2003/0117635 A1 | 6/2003 | Roberts | |

OTHER PUBLICATIONS

Take a card please . . . Direct Marketing, v52, n10, p. 63(6), Raphel Murray, Feb. 1990.*

* cited by examiner

*Primary Examiner* — John G Weiss
*Assistant Examiner* — Victoria Vanderhorst
(74) *Attorney, Agent, or Firm* — Schwartz Law Firm, P.C.

(57) ABSTRACT

A business method for promoting goods and services of providers includes the steps of designating a group of targeted recipients, and storing demographics information of each recipient in an electronic database. A plurality of direct mail items including provider promotions is generated, and each marked with a machine-readable ID code unique to each of the recipients. The direct mail items are sorted by their respective ID codes into cooperative mail packages, each mail package containing multiple items with common ID codes. The mail packages are then forwarded to respective recipients. After redemption of a direct mail item by a recipient, the ID code is read and electronically linked with the recipient's demographics information contained in the electronic database. A report is generated based on the direct mail items redeemed.

1 Claim, 3 Drawing Sheets

BUSINESS METHOD FOR PROMOTING GOODS AND SERVICES OF PROVIDERS

TECHNICAL FIELD AND BACKGROUND OF THE INVENTION

This invention relates to a business method for promoting goods and services of providers, such as business owners, through the distribution and tracking of direct mail promotional items. The invention utilizes machine-readable codes applied to the items. When the items are redeemed and the codes scanned, useful information concerning the recipient of the item is acquired and reported. The invention reveals trends relevant to particular customer groups, markets and industries, provides valuable demographics information to business owners, and generates customer and prospects lists for future mailings.

Unlike other direct mail promotions, the present invention designates a targeted group of recipients and preselects multiple items highly relevant to the group for mailing in a bundled cooperative mail package. For example, if the targeted group is first-time parents, each package may include paper coupons for a baby furniture store, diapers and wipes, daycare and pediatrician services, baby formula, and the like. Some recipients in the group may receive more or less items, or even different but related items based on demographics and other valuable information obtained in previous mailings to similarly situated recipients. Similarly, the invention may also generate secondary mailings to recipients based on past item redemptions. For example, if a recipient in a direct mailing which targets new residents redeems an item at a furniture store to purchase a baby's crib, the secondary mailing to that recipient may include direct mail items relating to baby formula, diapers, and the like.

Prior art U.S. Pat. No. 4,752,675 to Zetmeir describes a comparable method for determining the effectiveness of a mass mailing. In Zetmeir, random direct mail items are mailed individually to a class of recipients. The mass mailing is not targeted based on the nature of the goods and services advertized, nor does the mailing include multiple items in a single cooperative mail package.

SUMMARY OF INVENTION

Therefore, it is an object of the invention to provide a business method for promoting goods and services of providers through the distribution and tracking of direct mail items.

It is another object of the invention to provide a business method which utilizes cooperative mail packages which are precisely customized for each recipient with certain direct mail items most likely to be redeemed.

It is another object of the invention to provide a business method which conveniently and efficiently tracks the redemption of direct mail items.

It is another object of the invention to provide a business method which promotes efficient use of provider advertizing.

It is another object of the invention to provide a business method which reveals trends relevant to particular customer groups, markets and industries.

It is another object of the invention to provide a business method which conveys valuable customer demographics information to business owners.

These and other objects of the present invention are achieved in the preferred embodiments disclosed below by providing a business method for promoting goods and services of providers. The business method includes the steps of designating a group of targeted recipients, and storing demographics information of each recipient in an electronic database. A plurality of direct mail items including provider promotions is generated, and each marked with a machine-readable ID code unique to each of the recipients. The direct mail items are sorted by their respective ID codes into cooperative mail packages, each mail package containing multiple items with common ID codes. The mail packages are then forwarded to respective recipients. After redemption of a direct mail item by a recipient, the ID code is read and electronically linked with the recipient's demographics information contained in the electronic database. A report is generated based on the direct mail items redeemed.

The term "demographics information" is defined broadly herein and includes, but is not limited to, one or more of name, address, age, gender, income level, and dwelling type.

The term "direct mail item" is also defined broadly as any written or electronic communication.

The term "cooperative mail package" refers to the assembly of multiple direct mail items into a single package. Preferably, the items are preselected based on certain anticipated needs or desires of recipients in a targeted group. For example, new home owners may desire coupons or gift certificates for a home improvement store, landscape nursery, window treatments, and the like.

According to another preferred embodiment of the invention, the mail packages are sorted based on the number of direct mail items contained in each package, such that each package in a sorted group has an equal number of direct mail items.

According to another preferred embodiment of the invention, the targeted group of recipients includes new residents having relocated from one zip code to another.

According to another preferred embodiment of the invention, the demographics information includes statistical data selected from a group consisting of address, age, gender, and income.

According to another preferred embodiment of the invention, the machine-readable ID code is standard bar coding.

According to another preferred embodiment of the invention, the method includes forwarding the mail packages to recipients via a postal service.

According to another preferred embodiment of the invention, the method includes forwarding the mail packages to recipients via electronic mail.

According to another preferred embodiment of the invention, the report includes a secondary mailing report containing demographics information for at least a portion of the targeted group for purposes of generating additional direct mail items.

According to another preferred embodiment of the invention, the report includes a trending report including a redemption ranking of direct mail items for goods and services classified by subject matter.

According to another preferred embodiment of the invention, the report includes demographics information for recipients redeeming the direct mail items.

According to another preferred embodiment of the invention, the method includes forwarding redeemed direct mail items to a clearinghouse for reading respective ID codes.

According to another preferred embodiment of the invention, the method includes surveying the recipient after the direct mail item is redeemed.

According to another preferred embodiment of the invention, the step of generating the direct mail items includes printing sheets of paper coupons, each sheet comprising first and second coupon sections.

According to another preferred embodiment of the invention, the method includes stacking the sheets such that the first coupon sections and the second coupon sections are arranged, respectively, in vertical registration.

According to another preferred embodiment of the invention, the method includes collating the coupons such that respective cooperative mail packages are assembled in sequence from coupons cut from the first coupon section of each stacked sheet, and after the first coupon sections are exhausted, from the second coupon section of each stacked sheet.

In another embodiment, the invention is a cooperative mail package containing multiple direct mail items comprising promotions designed for promoting goods and services of providers. The direct mail items include common machine-readable ID codes unique to an individual recipient. Each ID code is adapted for being electronically linked to recipient demographics information contained in an electronic database.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Broadly stated, the present business method designates a targeted group of consumers (referred to as "Recipients"), utilizes direct mail Items to promote goods and services of local businesses (referred to as "Providers"), marks the Items with machine-readable Barcode, forwards the Items in cooperative mail Packages to the Recipients, and tracks redemption of the Items for subsequent reporting. In one embodiment, the targeted Recipients are new residents—i.e., individuals and families who have relocated from one zip code to another. Other targeted groups may include, for example, new businesses, first-time parents, members of a particular organization or trade, or groups based on specific demographics criteria, such as age, income level, education, lifestyle, and the like. The direct mail Items may be coupons, gift certificates, discount sale notices, and other forms of advertizing. A System Administrator manages and coordinates each of the various steps indicated above and discussed in further detail below.

Figure 1:
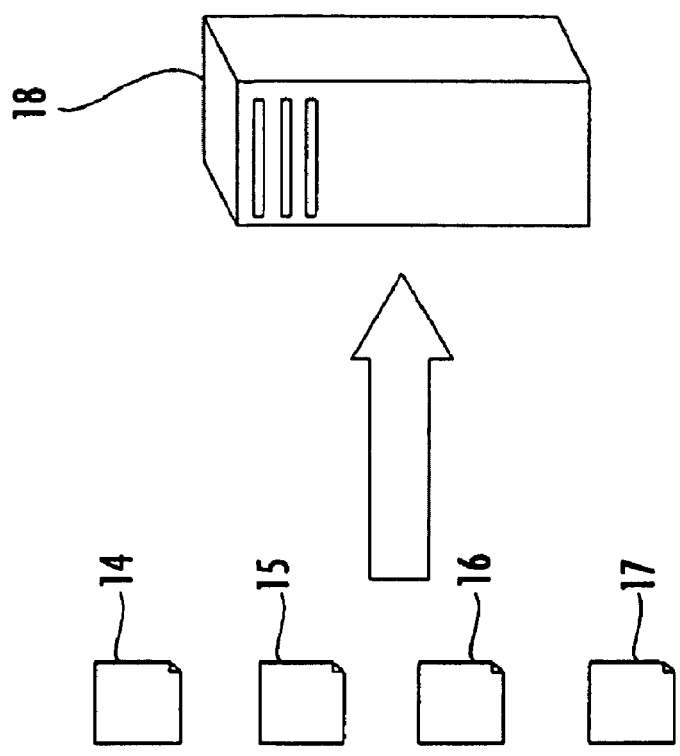
FIG. 1 is a flow diagram illustrating the initial steps of a business method according to one preferred embodiment of the present invention.
Figure 1:
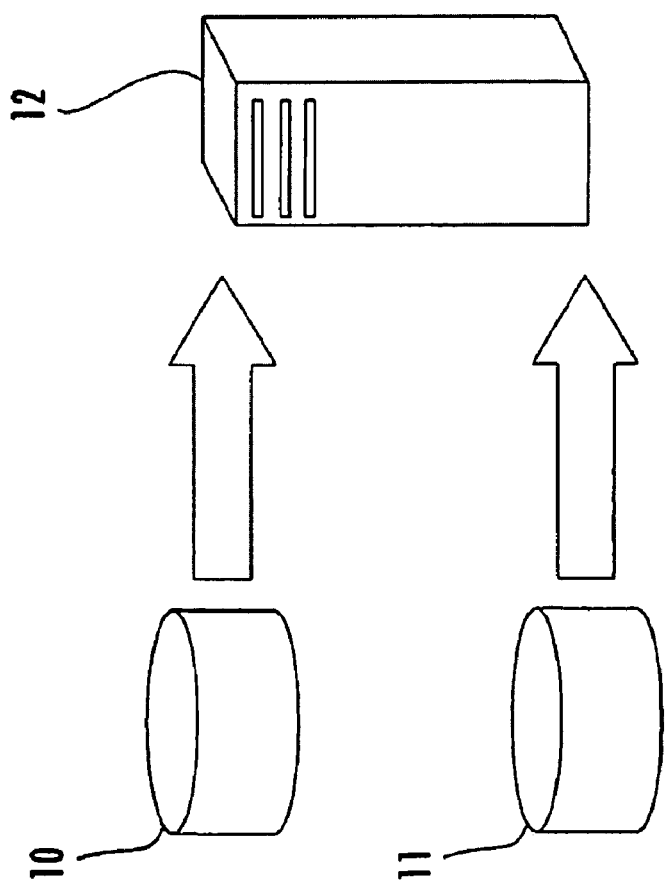

Referring to the flow diagram of FIG. 1, separate databases 10 and 11 are built containing information relevant to both the Providers and the Recipients. The Provider Database 10 stores business ID numbers, mailing zones, etc., and certain business account information used by the System Administrator. The Recipient Database 11 stores demographic information including names, addresses, ages, gender, income levels, etc. for each of the Recipients.

The Provider and Recipient Databases 10, 11 are merged together using a system application, indicated at 12. The merged data results in a single electronic Record for each Recipient. Each Record contains a certain number of (electronic) direct mail Items, and machine-readable barcode elements comprising unique ID numbers. The application 12 identifies the number of direct mail Items to be included in each Record, and merges all Records containing the same number of Items into a single Data File. Multiple Data Files 14, 15, 16, and 17 are shown in FIG. 1. The application 12 further generates summary reports which identify the number of direct mail Items in each Data File 14-17, the number of direct mail Items being mailed to various zip codes, and certain provider billing information, such as rate, discounts, etc. relevant to the System Administrator.

After generating the Data Files 14-17, a commercial postal sorting application 18 cleans and verifies the recipient addresses indicated in respective Records. Appropriate postal information is inserted into each Data File 14-17 so that maximum postage discounts are achieved for all direct mail Items. The postal-sorted Files are then pre-collated in two notional "cylinders" one cylinder comprising material for occupying a top section of a printed item Sheet (described below), and the other cylinder comprising material for occupying the bottom section. Ultimately, the two cylinders generate a stack of printed item Sheets with the top and bottom sections containing respective direct mail Items. The Sheets are stacked in exact vertical registration for proper cutting and separation of the top and bottom sections. The recipient Records contain respective direct mail Items arranged in sequence starting from the top sections of the stacked item Sheets, and after the top sections are exhausted, from the bottom sections of the Sheets.

Figure 2:
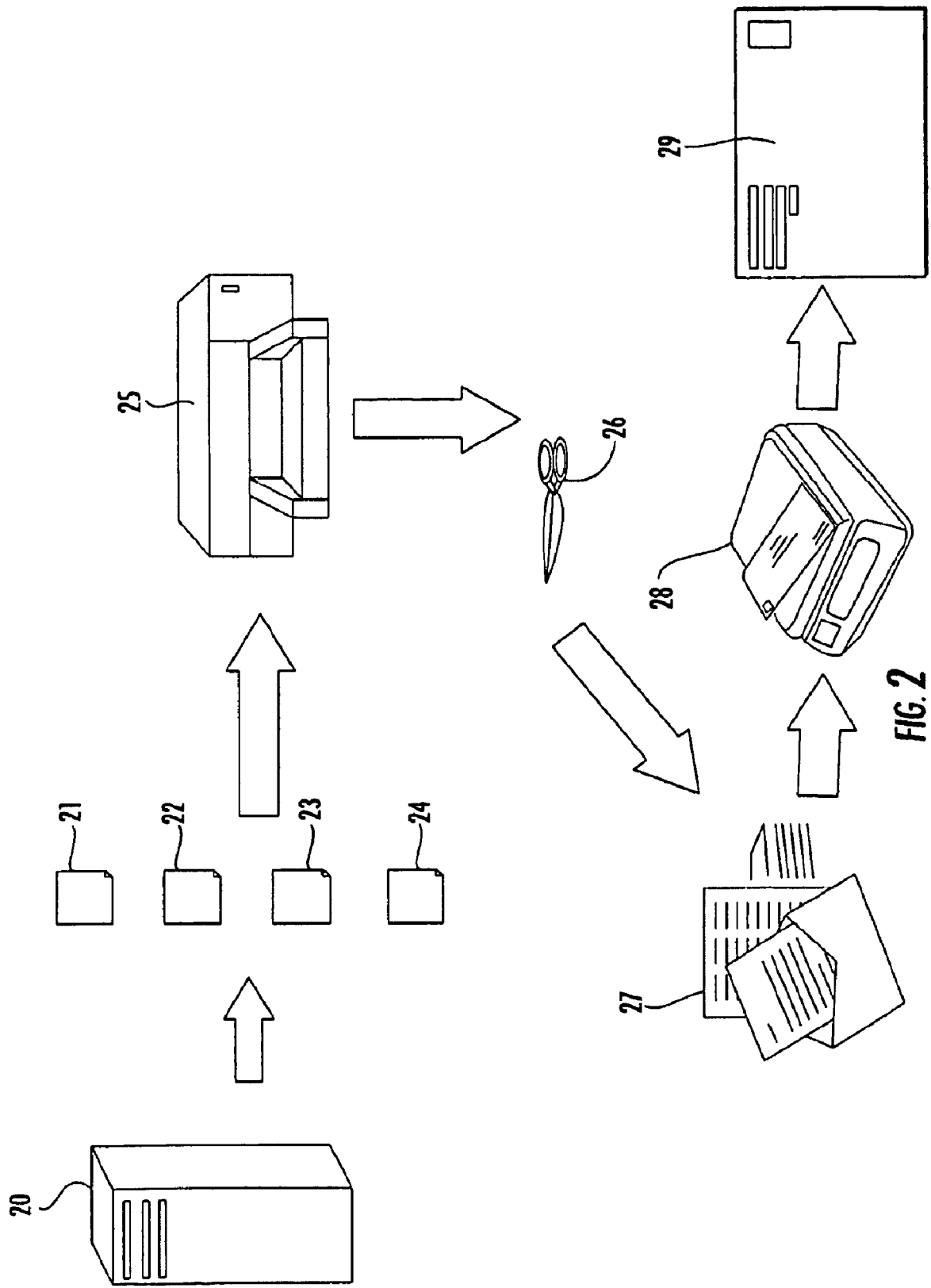
FIG. 2 is a continuation of the flow diagram provided in FIG. 1.

Referring to FIG. 2, once pre-collated, the Data Files are run through a commercial, variable data software program 20, such as Paris Software™ sold by Xerox, for formatting and graphics rules. This program 20 generates one direct mail Item in the top section of the item Sheet and a second Item in the bottom section of the item Sheet, as previously described. The unique recipient Barcode is applied to both sections. The program 20 converts the Data Files to Output Files 21, 22, 23, and 24 in Adobe Postscript® format ready for printing. The Output Files 21-24 are printed, as indicated at 25, on 8.5×11-inch paper item Sheets stacked in the exact sequence of printing. The item Sheets are then cut in half, as indicated at 26, to separate the direct mail Items printed in respective top and bottom sections. The direct mail Items of each Record are placed into a single envelope, as indicated at 27, the enveloped weighed and metered, as indicated at 28, and then forwarded to the Recipient in a cooperative mail Package, indicated at 29.

Figure 3:
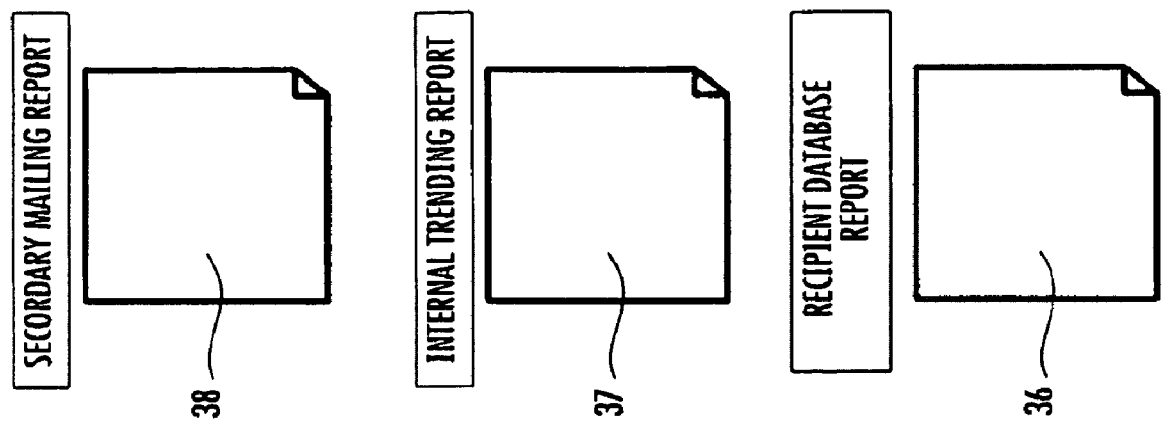
FIG. 3 is a further continuation of the flow diagrams provided in FIGS. 1 and 2.
Figure 3:
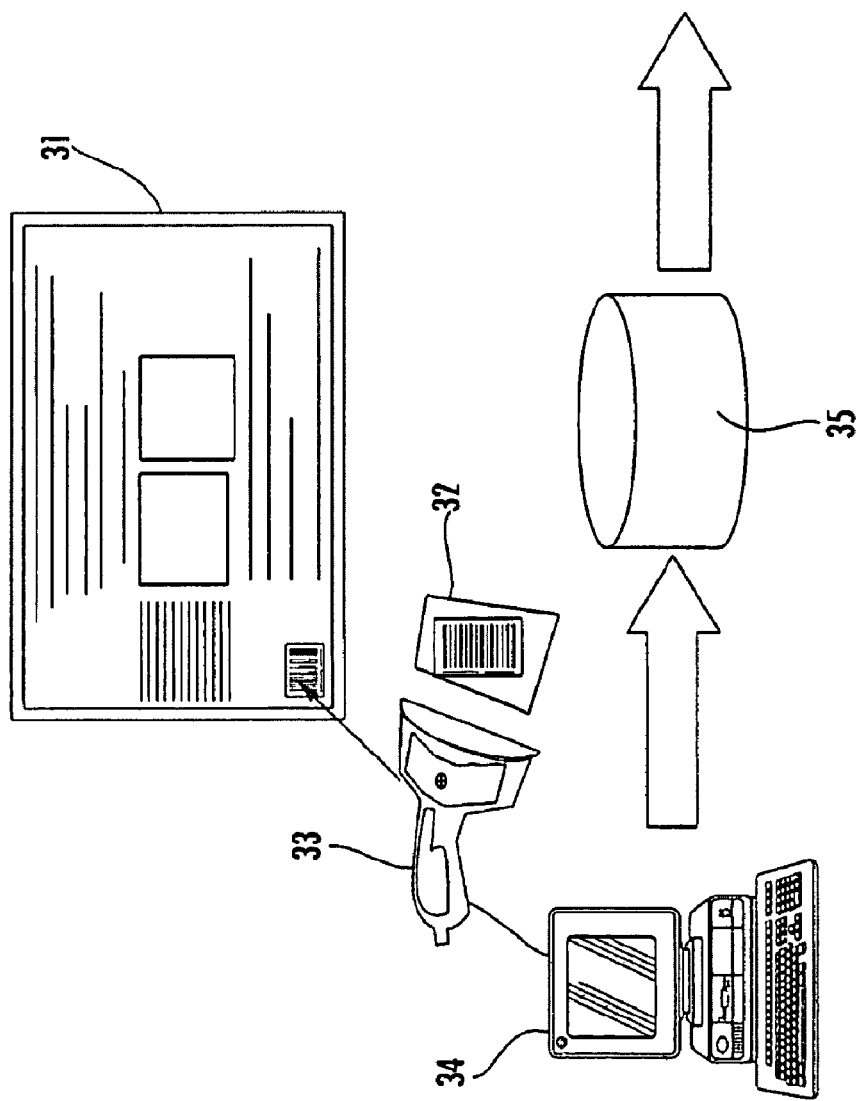

Referring to FIG. 3, as Recipients redeem their direct mail Items 31 with respective Providers, the Items are collected by the Providers and sent (electronically, faxed, or mailed) to an internal clearinghouse where all Barcodes 32 are scanned using an appropriate reader 33. Once the Barcode 32 is scanned, an internal program 34 searches through a Central Database 35 which stores Records of all Recipients including information, such as household type (e.g., SFH or MFH), Recipient name and address, gender, age, and income level. The program 34 matches the scanned Barcode 32 with its associated Record. Using recipient information contained in the Record, one or more of several useful reports can be generated. For example, a Provider Database Report 36 contains demographics information for all Recipients who redeemed their direct mail Items with a particular Provider. An internal Trending Report 37 allows the System Administrator to track overall redemption of direct mail Items by subject matter or other classification criteria. A Secondary Mailing Report 38 creates a mailing list for Providers for sending subsequent promotions. These further promotions may be for complementary goods or services based on past Items redeemed by the Recipient. Using the valuable information contained in these and other reports generated from previous mailings to similarly situated Recipients, some Recipients of a targeted group may receive more or less Items, or even different but related Items.

In addition, either before or after generating the reports, the System Administration may contact and survey those Recipients who redeemed their direct mail Items. Survey questions may concern the quality of the Provider's goods or services, customer service, store location, hours of operation, parking convenience, and other matters of interest. Preferably, the survey is administered on-line at a web site maintained by the System Administrator.

A business method for promoting goods and services of providers is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A business method for promoting goods and services of providers, comprising:
   designating a group of targeted direct mail recipients, said recipients comprising new residents having relocated from one zip code to a predetermined zip code;
   storing demographic information of each new resident in an electronic database said demographic information comprising at least recipient name and address;
   generating a plurality of direct mail items comprising provider promotions, and preselecting from the plurality of direct mail items only those provider promotions relevant to the new residents relocated to the predetermined zip code, wherein generating the direct mail items comprises:
   printing sheets of paper coupons, each sheet comprising first and second coupon sections;
   stacking the sheets of paper coupons such that the first coupon sections and the second coupon sections are arranged, respectively, in vertical registration;
   cutting the stacked sheets of paper coupons to separate the first and second coupon sections;
   marking each of the preselected direct mail items with a machine-readable code unique to each of the new residents;
   sorting the preselected direct mail items by their respective codes into cooperative mail packages, each mail package containing multiple items with common codes;
   collating the direct mail items such that respective cooperative mail packages are assembled in sequence from coupons cut from the first coupon section of each stacked sheet, and after the first coupon sections are exhausted, from the second coupon section of each stacked sheet;
   sorting the mail packages based on the number of direct mail items contained in each package, such that each package in a sorted group has an equal number of direct mail items;
   forwarding the mail packages to respective new residents for redemption by the new residents;
   after redemption of a direct mail item by a new resident, scanning the code using a reader and electronically linking it with the new resident's demographic information contained in the electronic database;
   forwarding redeemed direct mail items to a clearinghouse for reading respective: codes;
   generating a report based on the redeemed direct mail items, wherein said report comprises:
   a secondary mailing report containing demographic information for at least a portion of the targeted group for purposes of generating additional direct mail items;
   a trending report including a redemption ranking of direct mail items for goods and services classified by subject matter; and
   demographic information for new residents redeeming the direct mail items.

* * * * *